United States Patent [19]

Leonard

[11] Patent Number: 5,768,464
[45] Date of Patent: Jun. 16, 1998

[54] SINGLEMODE OPTICAL FIBER SIGNAL TERMINATION TOOL

[76] Inventor: Pierre Leonard, 5052 Victoria Avenue, Montreal, Canada, H3W 2N3

[21] Appl. No.: 736,430

[22] Filed: Oct. 24, 1996

[51] Int. Cl.⁶ .................................................. G02B 6/36
[52] U.S. Cl. ................................... 385/139; 385/32
[58] Field of Search .......................... 385/31, 32, 134, 385/136, 137, 139, 140, 147

[56] References Cited

U.S. PATENT DOCUMENTS

| | | | |
|---|---|---|---|
| 4,697,869 | 10/1987 | So et al. | 385/140 |
| 4,721,351 | 1/1988 | Goepfert et al. | 385/32 |
| 4,822,125 | 4/1989 | Beals et al. | 385/140 X |
| 4,998,795 | 3/1991 | Bowen et al. | 385/139 X |
| 5,311,614 | 5/1994 | Caron et al. | 385/140 |

Primary Examiner—John D. Lee

[57] ABSTRACT

A tool to terminate, without back-reflection, the signal transmitted within singlemode optical fibers. The reflection-free termination is induced by exposing singlemode optical fibers to a series of macrobends at a predetermined extent. The macrobends are produced by straight or U-shape pins, pre or mechanically positioned, which are perpendicular to a base plate and supported by the base plate of the tool. The fibers are snaked manually through the pre-positioned pins or simply inserted in the U-shaped pins. The pre-positioned pins induce macrobends of a predetermined extent to the fiber/s which terminate, without back-reflection, the optical signal. Similarly, the mechanical design places the pins in position for inducing the macrobends of a predetermined extent and hence, terminating the optical signal without back-reflection.

19 Claims, 5 Drawing Sheets

ND// 5,768,464

SINGLEMODE OPTICAL FIBER SIGNAL TERMINATION TOOL

FIELD OF THE INVENTION

This invention is a tool which terminates an optical signal, without back-reflection, in singlemode optical fibers. Its category is found within test & measurement instruments for telecommunication firms installing or transmitting on singlemode optical fibers. The principal use for the tool is to terminate an optical fiber signal, without back-reflection, so that the user, with his own Optical Return Loss (ORL) tester, can then test for ORL or optical back reflection within a singlemode optical fiber prior to the reflection-free termination. It should be noted throughout this document that the expression "singlemode optical fiber" refers to a fiber designed to operate around the standard fiber telecommunication windows centered on wavelength of 1310 nm and 1550 nm. It should also be noted that the expressions "without back-reflection" and "reflection-free" refer to a reflection below the ORL tester detection capability and exclude the intrinsic fiber back-scattering. Finally, it should be noted that "optical fiber" is used to describe the optical fiber itself (core & cladding) as well as its surrounding protective layers.

BACKGROUND OF THE INVENTION

Presently, the most common means of terminating a singlemode optical fiber is by wrapping the fiber tightly around a 4 to 10 mm diameter cylinder such as the end of a common screwdriver. This method requires good judgment from a user and is done manually. Hence, the procedure is time consuming and there is significant inaccuracy in acquired results due to human error. Furthermore, the wrapping of the singlemode optical fiber causes stress, torsion, and sometimes elongation to the singlemode optical fiber, depending on the user's technique, which are undesirable states for the proper use of the singlemode optical fiber.

Another known means of terminating a singlemode optical fiber is to apply a refractive index matching gel to an endface of the singlemode fiber to diffuse and thus terminate the signal. This however requires access to the endface and cannot be made between the starting and ending ends of the singlemode fiber without severing the fiber. Furthermore, the gel must be chemically cleaned off the fiber and the endface replaced in its original location when the signal is to be re-established which are two time consuming steps.

SUMMARY OF THE INVENTION

The invention eliminates user dependent factors and the need for wrapping singlemode optical fibers around a cylinder. Instead, the invention provides the means to subject a singlemode fiber to a series of macrobends where the additive effect of each macrobend allows the termination, without back-reflection, of the signal in the singlemode optical fiber. The smaller the radius of curvature of the macrobends the less macrobends there needs to be for a given quality of termination. However, curvature of less than 4 mm risks damaging the fiber and a radius of curvature too high (10 mm or more) requires many macrobends and consequently a long fiber length is required where the internal back-scattering of the fiber length becomes noticeable. Since there is no actual singlemode optical fiber wrapping being performed, the invention causes negligible stress, torsion or elongation to the singlemode optical fiber. The invention can be used manually or be motorized making automation possible and hence, reducing human error to almost nil. Therefore, the invention allows for increased testing speed and indirectly provides a means to produce accurate testing results.

BRIEF DESCRIPTION OF THE DRAWINGS

Embodiments of the invention are illustrated by the accompanying drawings, in which.

DETAILED DESCRIPTION OF PREFERRED EMBODIMENTS

Figure 1:
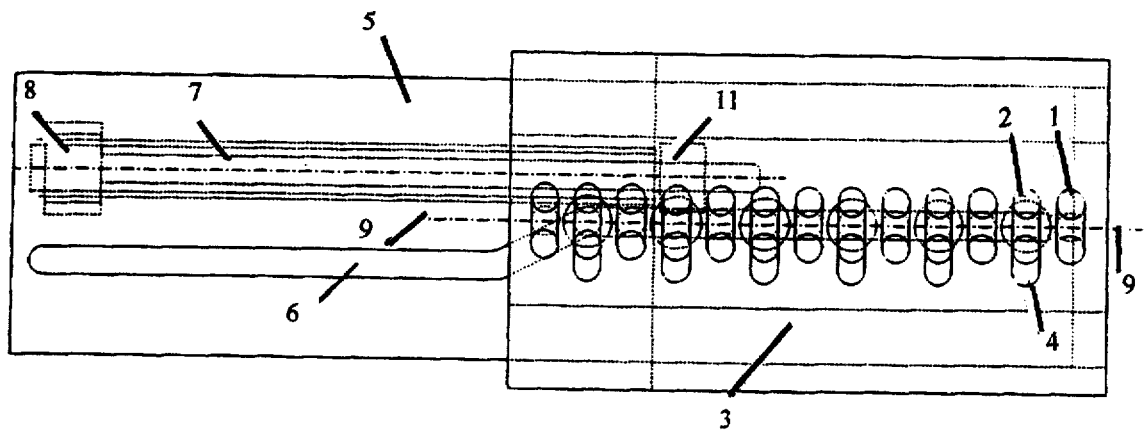
FIG. 1 shows a top view of a preferred embodiment of the tool in a motorized configuration.

The following descriptions are made with references to FIGS. 1 to 15 and the same reference numerals are used to represent the same element throughout the figures.

Referring now to FIGS. 1,2,3,4,5 and 8. The tool terminates, without reflection, a signal transmitted within singlemode optical fibers for use with Optical Return Loss (ORL) tester. The tool is comprised of a base plate 3 which has a row of elongated holes 4 with an extremity aligned on a longitudinal axis 9 and with their elongation perpendicular to the axis 9, the elongated holes 4 being elongated toward a common orientation. The tool also is comprised of U-shape static pins 1 having cylindrical arms 18 and a protruding base 19, the gap between the arms 18 being substantially the outer diameter of a singlemode optical fiber, the static pins 1 being fixed along on each side of the elongated holes 4 and with their protruding base 19 aligned on the axis 9. Furthermore, there is a sliding plate 5 sliding parallel and against the base plate 3 along the axis 9, the sliding plate 5 having a perforated trace 6, the perforated trace 6 having two straight portions parallel but offset perpendicularly to the axis 9 and having a third oblique portion joining the two straight portions. In addition, there are U-shape dynamic pins 2 having cylindrical arms 18 and a protruding base 19 with a removable cap 20 and a rim 24, the gap between the arms 18 being substantially the outer diameter of a singlemode optical fiber, the dynamic pins 2 protruding base 19 being each inserted into the elongated holes 4 of the base plate 3 and simultaneously into the perforated trace 6 of the sliding plate 5, the removable cap 20 being placed at the end of the protruding base 19 in between the sliding plate 5 and the supporting means 10 to prevent the dynamic pins 2 from being pulled out of the elongated holes 4 while the rim prevents the arms 18 of the dynamic pins 2 to sink in the elongated holes 4. The elongated holes 4 having a length substantially equal to the center to center distance of the arms 18 of the dynamic pins 2. The two parallel sections of the perforated trace 6 being separated by a distance substantially equal to the center to center distance of the arms 18 of the dynamic pins 2. A supporting means 10 is also present to support the sliding plate 5 fixed under and against the base plate 3, the supporting means 10 allowing the sliding plate 5 to move along the axis 9 while constraining the sliding plate 5 to remain parallel to the base plate 3. Whereby when singlemode optical fibers are inserted along the axis 9 between the arms 18 of the static pins 1 and dynamic pins 2, a series of macrobends are induced by moving the sliding plate 5 toward a first longitudinal direction which causes each dynamic pin 2 to move away from the axis 9 as it is guided from the first perforated trace 6 section to the offset perforated trace 6 section, the series of macrobends are undone by moving the sliding plate 5 in a second longitudinal direction opposite the first longitudinal direction.

Figure 8:
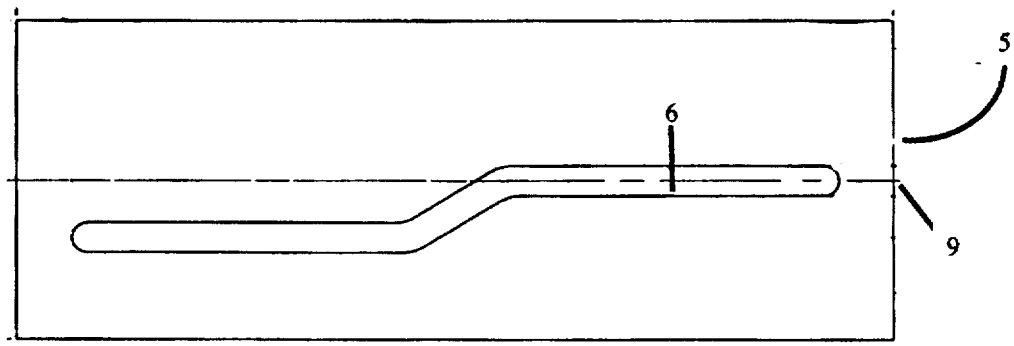
FIG. 8 shows a top view of a sliding plate of a preferred embodiment of the tool.
Figure 9:
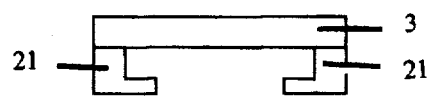
FIG. 9 shows a side view of a base plate for a preferred embodiment of the tool not using a bottom plate.

Referring now to FIGS. 8 and 9. A first preferred embodiment is obtained when the supporting means 10 is made by extending the longitudinal periphery of the base plate 3 with L-shaped sections 21, the first part of the L-shaped sections 21 extending under the base plate 3 perpendicularly by a distance substantially equal to the sliding plate 5 thickness and the second part of the L-shaped sections 21 extending toward the middle of the base plate 3 in parallel to the base plate 3.

Figure 6:
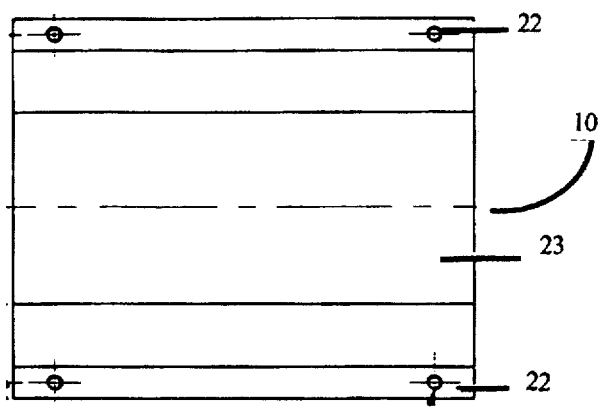
FIG. 6 shows a top view of a bottom plate of a preferred embodiment of the tool.
Figure 7:
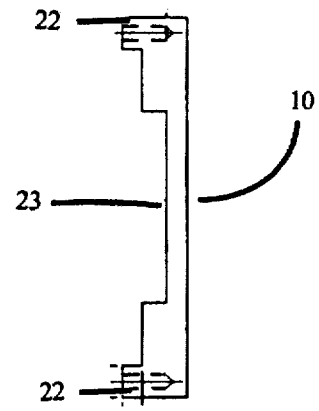
FIG. 7 shows a lateral side view of a bottom plate of a preferred embodiment of the tool.

Referring now to FIGS. 6, 7 and 8. A second preferred embodiment is obtained when the supporting means 10 consists of a bottom plate 10 substantially the same size as the base plate 3 with two elevated borders 22 along the longitudinal sides, the elevated borders 22 having a thickness substantially equal to the sliding plate 5 thickness, the elevated borders 22 being separated by a distance substantially equal to the sliding plate 5 width, the bottom plate 10 being aligned and fixed under the base plate 3. The bottom plate has a rectangular groove 23 to allow free movement of the removable caps 20 of the dynamic pins 2.

Figure 2:
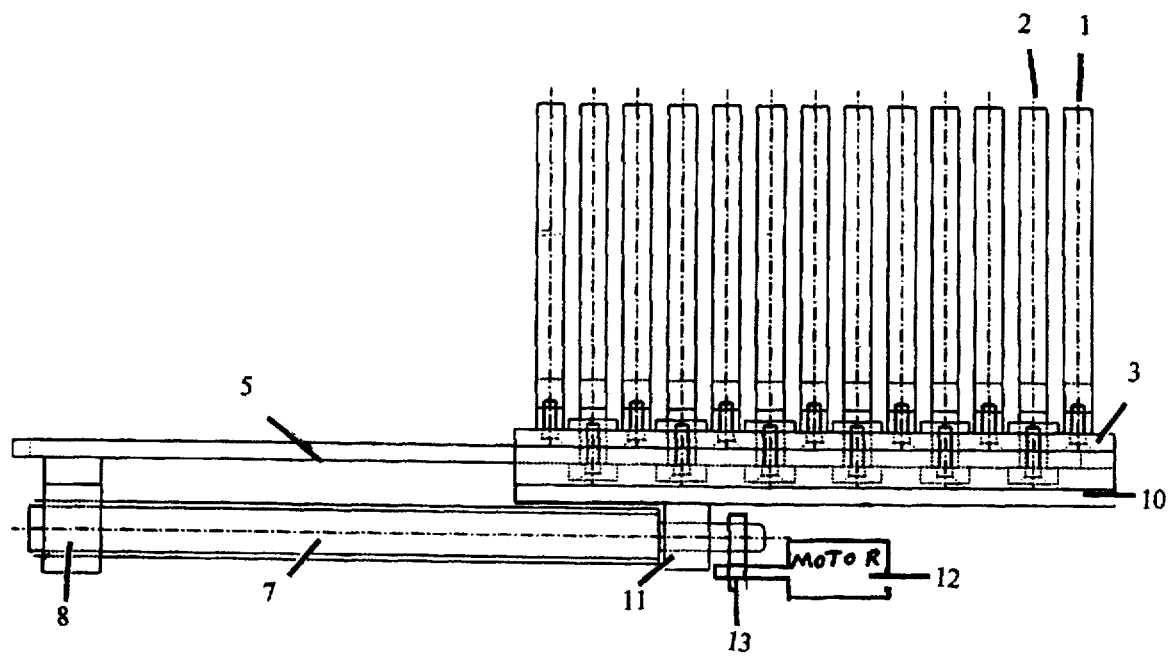
FIG. 2 shows a side view of a preferred embodiment of the tool in a motorized configuration.
Figure 3:
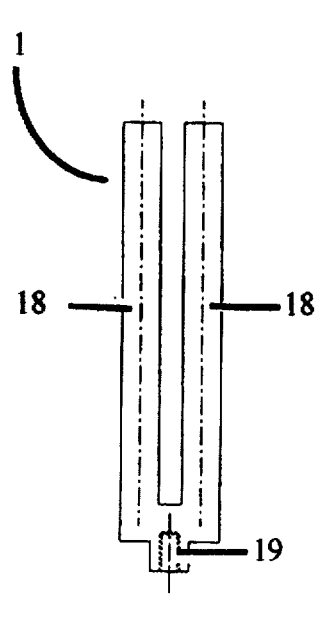
FIG. 3 shows a side view of an example of a U-shape static pin of a preferred embodiment of the tool.
Figure 4:
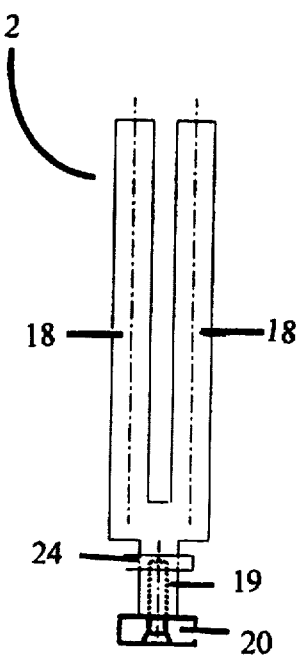
FIG. 4 shows a side view of an example of a U-shape dynamic pin of a preferred embodiment of the tool.
Figure 5:
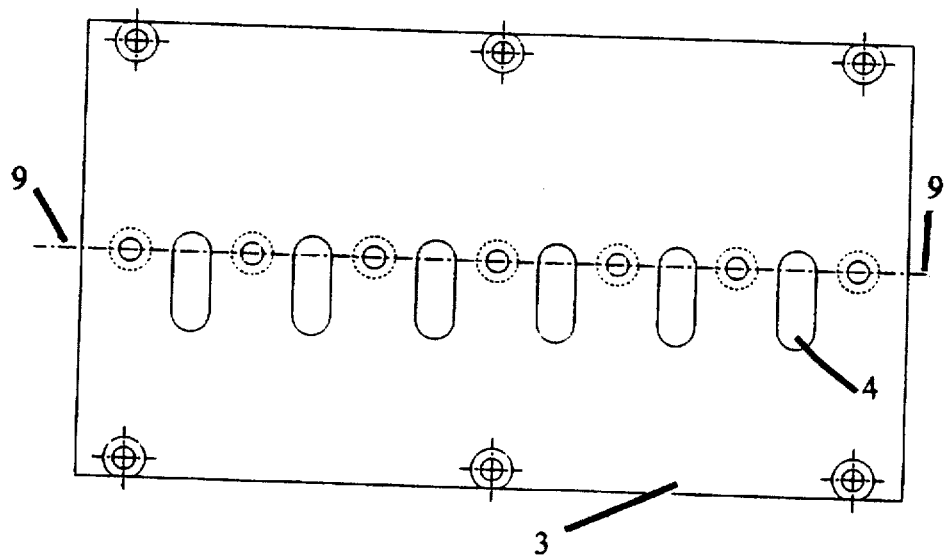
FIG. 5 shows a top view of an example of a base plate of a preferred embodiment of the tool.

Referring now to FIGS. 1 and 2. Other preferred embodiments are obtained when the first or second preferred embodiment further comprises a threaded shaft 7 having one end terminated by a threadless section. Also, there is a first shaft support 8, the first shaft support 8 having a threaded hole substantially matching the threads of the threaded shaft 7, the first shaft support 8 being fixed under the sliding plate 5 toward the extremity furthest from the base plate 3. In addition, a second shaft support 11 is provided, the second shaft support 11 having a threadless hole substantially matching the threadless section of the threaded shaft 7, the second shaft support 11 being fixed under the supporting means 10. Also included, a bi-directional motor 12 having a rotation shaft and a rotation transfer means 13 linking the rotation shaft to the treaded shaft 7. Whereby, by externally controlling the motor 12 it is possible to create and undo macrobends in single mode optical fibers inserted inside the static pins 1 and dynamic pins 2.

Figure 10:
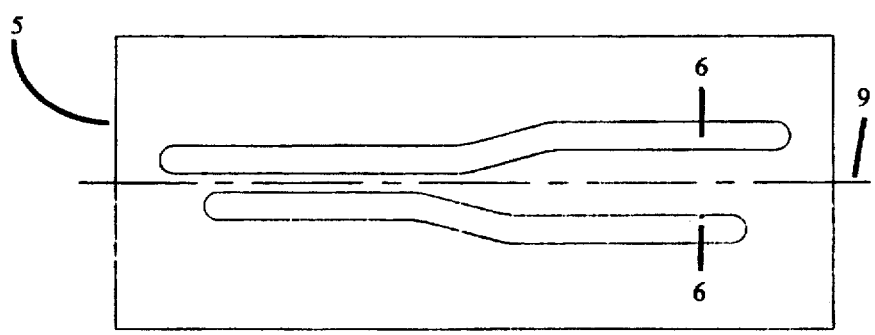
FIG. 10 shows a top view of a sliding plate for a preferred embodiment of the tool having only dynamic pins.
Figure 11:
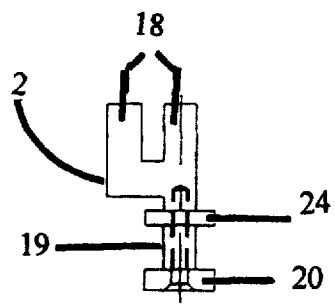
FIG. 11 shows a side view of a dynamic pin for a preferred embodiment of the tool having only dynamic pins.
Figure 12:
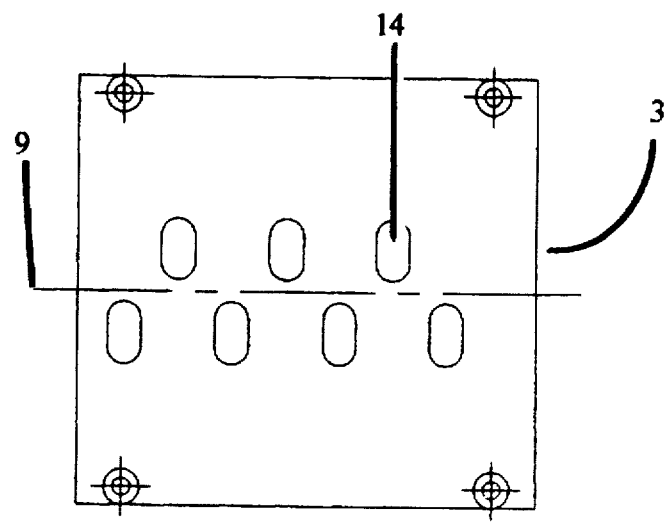
FIG. 12 shows a top view of a base plate for a preferred embodiment of the tool having only dynamic pins.

Referring now to FIGS. 10, 11 and 12. A third preferred embodiment of the tool is one comprising a base plate 3, the base plate 3 having a row of elongated holes 4 with an extremity aligned on a longitudinal axis 9 and with an elongation perpendicular to the axis 9, the elongated holes 4 being elongated alternately toward an opposite orientation. Also comprised is a sliding plate 5, the sliding plate 5 sliding parallel and against the base plate 3 along the axis 9, the sliding plate 5 having two perforated traces 6, the perforated traces 6 having each two straight portions parallel but offset perpendicularly to the axis 9 and each having a third oblique portion joining the two straight portions, the two perforated traces 6 being disposed with each oblique portions going away from the axis 9 of the sliding plate 5. Furthermore, U-shape dynamic pins 2 having cylindrical arms 18 and a protruding base 19 with a removable cap 20 and a rim 24 are provided, the gap between the arms 18 being substantially the outer diameter of a singlemode optical fiber, the protruding bases 19 being offset from the center of the arms 18, the dynamic pins 2 being each inserted into the elongated holes 4 of the base plate 3 simultaneously and alternately into the respective perforated trace 6 of the sliding plate 5, the removable cap 20 being placed at the end of the protruding base 19 in between the sliding plate 5 and the supporting means 10 to prevent the dynamic pins 2 from being pulled out of the elongated holes 4 while the rim prevents the arms 18 of the dynamic pins 2 to sink in the elongated holes 4. The elongated holes 4 having a length substantially equal to half the center to center distance of the arms 18 of the dynamic pins 2. The two parallel sections of each perforated traces 6 being separated by a distance substantially equal to half the center to center distance of the arms 18 of the dynamic pins 2. The center of the two perforated traces 6 being separated at their closest point by a distance substantially equal to the center to center distance of the arms of the dynamic pins 2. As with the previous embodiments, there is a supporting means 10 to support the sliding plate 5 under and against the base plate 3, the supporting means 10 allowing the sliding plate 5 to move along the axis 9 while constraining the sliding plate 5 to remain parallel to the base plate 3.

Referring now to FIG. 9. A fourth preferred embodiment is obtained by extending the longitudinal periphery of the base plate 3, of the third preferred embodiment, with L-shaped sections 21, the first part of the L-shaped sections 21 extending under the base plate 3 perpendicularly by a distance substantially equal to the sliding plate 5 thickness and the second part of the L-shaped sections 21 extending toward the middle of the base plate 3 in parallel to the base plate 3.

Referring now to FIGS. 6 and 7. A fifth preferred embodiment is obtained, based on the third preferred embodiment, when the supporting means 10 consists of a bottom plate 10 substantially the same size as the base plate 3 with two elevated borders 22 along the longitudinal sides, the elevated borders 22 having a thickness substantially equal to the sliding plate 5 thickness, the elevated borders 22 being separated by a distance substantially equal to the sliding plate 5 width, the bottom plate 10 being aligned and fixed under the base plate 3. The bottom plate has a rectangular groove 23 to allow free movement of the removable caps 20 of the dynamic pins 2.

Other preferred embodiments are obtained, based on the fourth and fifth preferred embodiments, in that they can be motorized. Such embodiments comprise a threaded shaft 7 having one end terminated by a threadless section and also comprise a first shaft support 8, the first shaft support 8 having a threaded hole substantially matching the threads of the threaded shaft 7, the first shaft support 8 being fixed under the sliding plate 5 toward the extremity furthest from the base plate 3. They also are comprised of a second shaft support 11, the second shaft support 11 having a threadless hole substantially matching the threadless section of the threaded shaft 7, the second shaft support 11 being fixed under the supporting means 10. Furthermore, a bi-directional motor 12 having a rotation shaft and a rotation transfer means 13 linking the rotation shaft to the treaded shaft 7 are provided.

Preferably, there is more than 1 dynamic pin 2 in any embodiment having both static pins 1 and dynamic pins 2 and more than 3 dynamic pins 2 in any embodiment with only dynamic pins 2. The arms of the static pins 1 and dynamic pins 2 of all previously mentioned embodiments have a diameter between 4 to 10 mm while keeping a ratio of total number of pins over diameter greater or equal to 1 pin/mm.

Figure 13:
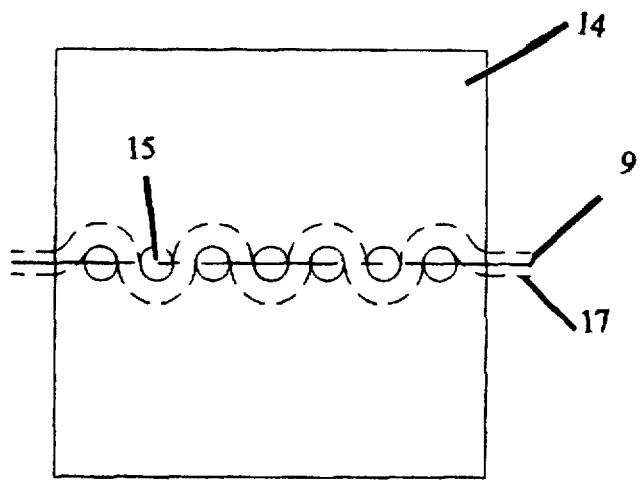
FIG. 13 shows a top view of an embodiment of the tool having only static pins.
Figure 14:
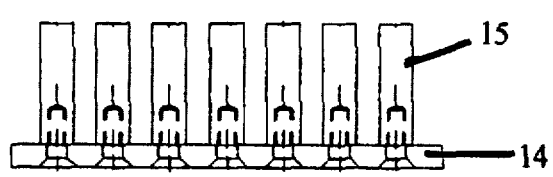
FIG. 14 shows a side view of an embodiment of the tool having only static pins.
Figure 15:
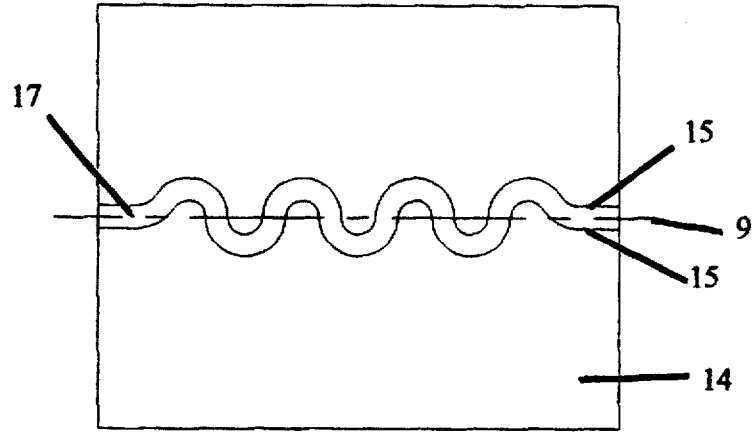
FIG. 15 shows a top view of an embodiment of the tool having a sinusoidal-shape groove.

Referring now to FIGS. 13 and 14. Another embodiment of the tool, is comprised of a base 14 and static means 15 fixed on the base 14 and having a round geometry along a sinusoidal-shape path 17 with a succession of periods, the sinusoidal-shape path 17 having a width substantially equal to the optical fibers diameter. Whereby when singlemode optical fibers are manually inserted along the sinusoidal-shape path 17, a series of macrobends are induced and maintained until removal of the singlemode optical fibers. Referring now to FIG. 15, the static means 15 can consist of a base 14 having a groove 15 substantially as wide as the diameter of the singlemode optical fibers, the groove 15 forming a sinusoidal-shape path 17 with a succession of periods. The sinusoidal-shape path 17 has preferably more than 1 sinusoidal-shape period, the sinusoidal-shape periods having preferably an amplitude between 4 to 10 mm while keeping a ratio of number of periods over amplitude greater or equal to 0.5 periods/mm. Referring to FIGS. 13 and 14 again, the static means 15 could also consists of a row of cylindrical pins 15 fixed unto the base 14 along a longitudinal axis 9, the cylindrical pins 15 being substantially separated from each other by the singlemode optical fiber diameter. In this case, there are preferably more than 3 cylindrical pins 15 having preferably a diameter between 4 to 10 mm while keeping a ratio of number of pins over diameter greater or equal to 1.

What I claim as my invention is:

1. A tool to terminate, without reflection, a signal transmitted within singlemode optical fibers for use with Optical Return Loss (ORL) tester, the tool comprising:

a base plate, the base plate having a row of elongated holes with an extremity aligned on a longitudinal axis, the elongated holes being elongated toward a common orientation perpendicular to the axis;

U-shape static pins having cylindrical arms and a protruding base, the gap between the arms being substantially the outer diameter of singlemode optical fiber, the static pins being fixed along on each side of the elongated holes and with the protruding base aligned on the axis;

a sliding plate, the sliding plate sliding parallel and against the base plate along the axis, the sliding plate having a perforated trace, the perforated trace having two straight portions parallel but offset perpendicularly to the axis and having a third oblique portion joining the two straight portions;

U-shape dynamic pins having cylindrical arms and a protruding base with a removable cap and a rim, the rim prevents the arms of the dynamic pins to sink in the elongated holes by being wider than the elongated holes, the gap between the arms being substantially the outer diameter of a singlemode optical fiber cable, the dynamic pins being each inserted into the elongated holes of the base plate and simultaneously into the perforated trace of the sliding plate, the removable cap being placed at the end of the protruding base in between the sliding plate and the supporting means to prevent the dynamic pins from being pulled out of the elongated holes, the elongated holes having a length substantially equal to the center to center distance of the arms of the dynamic pins; and supporting means to support the sliding plate under and against the base plate, the supporting means allowing the sliding plate to move along the axis while constraining the sliding plate to remain parallel to the base plate;

whereby when singlemode optical fibers are inserted along the axis between the arms of the static and dynamic pins, a series of macrobends are induced by moving the sliding plate along a first longitudinal direction parallel to the axis which causes each dynamic pin to move sequentially away from the axis as it is guided from the first perforated trace section to the offset perforated trace section, the series of macrobends are undone by moving the sliding plate in a second longitudinal direction opposite to the first longitudinal direction.

2. A tool as claimed in claim 1, wherein the supporting means is obtained by extending the longitudinal periphery of the base plate with L-shaped sections, the first part of the L-shaped sections extending under the base plate perpendicularly by a distance substantially equal to the sliding plate thickness and the second base plate part of the L-shaped sections extending toward the middle of the base plate in parallel to the base plate.

3. A tool as claimed in claim 1, wherein the supporting means consists of a bottom plate substantially the same size as the base plate with two elevated borders along the longitudinal sides, the elevated borders having a thickness substantially equal to the sliding plate thickness, the elevated borders being separated by a distance substantially equal to the sliding plate width, the bottom plate being aligned and fixed under the base plate, the bottom plate having a rectangular groove to allow free movement of the removable caps of the dynamic pins.

4. A tool as claimed in claim 2, further comprising:

a threaded shaft having one end terminated by a threadless section;

a first shaft support, the first shaft support having a threaded hole substantially matching the threads of the threaded shaft, the first shaft support being fixed under the sliding plate toward the extremity furthest from the base plate;

a second shaft support, the second shaft support having a threadless hole substantially matching the threadless section of the threaded shaft, the second shaft support being fixed under the supporting means;

a bi-directional motor having a rotation shaft;

a rotation transfer means linking the rotation shaft to the threaded shaft;

whereby upon activation of the motor, macrobends can be induced or undone, after insertion of singlemode optical fibers, depending on the chosen rotation direction of the motor.

5. A tool as claimed in claim 3, further comprising:

a threaded shaft having one end terminated by a threadless section;

a first shaft support, the first shaft support having a threaded hole substantially matching the threads of the threaded shaft, the first shaft support being fixed under the sliding plate toward the extremity furthest from the base plate;

a second shaft support, the second shaft support having a threadless hole substantially matching the threadless section of the threaded shaft, the second shaft support being fixed under the supporting means;

a bi-directional motor having a rotation shaft;

a rotation transfer means linking the rotation shaft to the threaded shaft;

whereby upon activation of the motor, macrobends can be induced or undone, after insertion of singlemode optical fibers, depending on the chosen rotation direction of the motor.

6. A tool as claimed in claim 4, wherein there is more than 1 dynamic pin and the arms of the static pins and dynamic pins have a diameter between 4 to 10 mm while keeping a ratio of total number of pins over diameter greater or equal to 1 pin/mm.

7. A tool as claimed in claim 5, wherein there is more than 1 dynamic pin and the arms of the static pins and dynamic pins have a diameter between 4 to 10 mm while keeping a ratio of total number of pins over diameter greater or equal to 1 pin/mm.

8. A tool to terminate, without reflection, a signal transmitted within singlemode optical fibers for use with Optical Return Loss (ORL) tester, the tool comprising:

a base plate, the base plate having a row of elongated holes with an extremity aligned on a longitudinal axis, the elongated holes being elongated alternately toward an opposite orientation perpendicular to the axis;

a sliding plate, the sliding plate sliding parallel and against the base plate along the axis, the sliding plate having two perforated traces, the perforated traces having each two straight portions parallel but offset perpendicularly to the axis and each having a third oblique portion joining the two straight portions, the two traces being disposed with each oblique portions going away from the center of the sliding plate;

U-shape dynamic pins having cylindrical arms and a protruding base with a removable cap and a rim, the rim prevents the arms of the dynamic pins from sinking in the elongated holes by being wider than the elongated holes, the gap between the arms being substantially the outer diameter of a singlemode optical fiber cable, the protruding bases being offset from the center of the arms, the dynamic pins being each inserted into the elongated holes of the base plate and simultaneously and alternately into the respective perforated trace of the sliding plate with the arms farthest from the protruding base toward the axis, the removable cap being placed between the sliding plate and the supporting means to prevent the dynamic pins from being pulled out of the elongated holes, the elongated holes having a length substantially equal to the center to center distance of the arms of the dynamic pins; and supporting means to support the sliding plate under and against the base plate, the supporting means allowing the sliding plate to move along the axis while constraining the sliding plate to remain parallel to the base plate;

the two parallel sections of each perforated traces being separated by a distance substantially equal to half the center to center distance of the arms of the dynamic pins, the center of the two perforated traces being separated at their closest point by a distance substantially equal to the center to center distance of the arms of the dynamic pins;

whereby when singlemode optical fibers are inserted along the axis between the arms of the dynamic pins, a series of macrobends are induced by moving the sliding plate toward a first longitudinal direction parallel to the axis which causes each dynamic pin to move sequentially away from the axis as they are guided from the first respective perforated trace section to the respective offset perforated section, the series of macrobends are undone by moving the sliding plate along a second longitudinal direction opposite from the first longitudinal direction.

9. A tool as claimed in claim 8, wherein the supporting means is obtained by extending the longitudinal periphery of the base plate with L-shaped sections, the first part of the L-shaped sections extending under the base plate perpendicularly by a distance substantially equal to the sliding plate thickness and the second part of the L-shaped sections extending toward the middle of the base plate in parallel to the base plate.

10. A tool as claimed in claim 8, wherein the supporting means is comprised of a bottom plate substantially the same size as the base plate with two elevated borders along the longitudinal sides, the elevated borders having a thickness substantially equal to the sliding plate thickness, the elevated borders being separated by a distance substantially equal to the sliding plate width, the bottom plate being aligned and fixed under the base plate, the bottom plate having a rectangular groove to allow free movement of the removable caps of the dynamic pins.

11. A tool as claimed in claim 9, further comprising:

a threaded shaft having one end terminated by a threadless section;

a first shaft support, the first shaft support having a threaded hole substantially matching the threads of the threaded shaft, the first shaft support being fixed under the sliding plate toward the extremity furthest from the base plate;

a second shaft support, the second shaft support having a threadless hole substantially matching the threadless section of the threaded shaft, the second shaft support being fixed under the supporting means;

a bi-directional motor having a rotation shaft;

a rotation transfer means linking the rotation shaft to the threaded shaft;

whereby upon activation of the motor, macrobends can be induced or undone, after insertion of singlemode optical fibers, depending on the chosen rotation direction of the motor.

12. A tool as claimed in claim 10, further comprising:

a threaded shaft having one end terminated by a threadless section;

a first shaft support, the first shaft support having a threaded hole substantially matching the threads of the threaded shaft, the first shaft support being fixed under the sliding plate toward the extremity furthest from the base plate;

a second shaft support, the second shaft support having a threadless hole substantially matching the threadless section of the threaded shaft, the second shaft support being fixed under the supporting means;

a bi-directional motor having a rotation shaft;

a rotation transfer means linking the rotation shaft to the threaded shaft;

whereby upon activation of the motor, macrobends can be induced or undone, after insertion of singlemode optical fibers, depending on the chosen rotation direction of the motor.

13. A tool as claimed in claim 11, wherein there are more than 3 dynamic pins and the arms of the dynamic pins have a diameter between 4 to 10 mm, while keeping a ratio of number of pins over diameter greater or equal to 1 pin/mm.

14. A tool as claimed in claim 12, wherein there are more than 3 dynamic pins and the arms of the dynamic pins have a diameter between 4 to 10 mm, while keeping a ratio of number of pins over diameter greater or equal to 1 pin/mm.

15. A tool to terminate, without reflection, a signal transmitted within singlemode optical fibers for use with Optical Return Loss (ORL) tester, the tool comprising:

a base;

static means fixed on the base having a round geometry along a sinusoidal-shape path with a succession of periods, the sinusoidal-shape path having a width substantially equal to the optical fibers diameter;

whereby when singlemode optical fibers are inserted along the sinusoidal-shape path, a series of macrobends are induced and maintained until removal of the singlemode optical fibers.

16. A tool as claimed in claim 15, wherein the static means consists of a block having a groove substantially as wide as the diameter of the singlemode optical fibers, the groove having a sinusoidal-shape path with a succession of periods.

17. A tool as claimed in claim 16, wherein the groove has more than 1 sinusoidal period, the sinusoidal periods having an amplitude between 4 to 10 mm, while keeping a ratio of number of periods over amplitude greater or equal to 0.5 periods/mm.

18. A tool as claimed in claim 15, wherein the static means consists of a row of cylindrical pins fixed unto the base along a longitudinal axis, the pins being substantially separated from each other by the diameter of the singlemode optical fibers.

19. A tool as claimed in claim 18, wherein there are more than 3 cylindrical pins having a diameter between 4 to 10 mm, while keeping a ratio of total number of pins over diameter greater or equal to 1 pin/mm.

* * * * *